United States Patent Office 2,751,363
Patented June 19, 1956

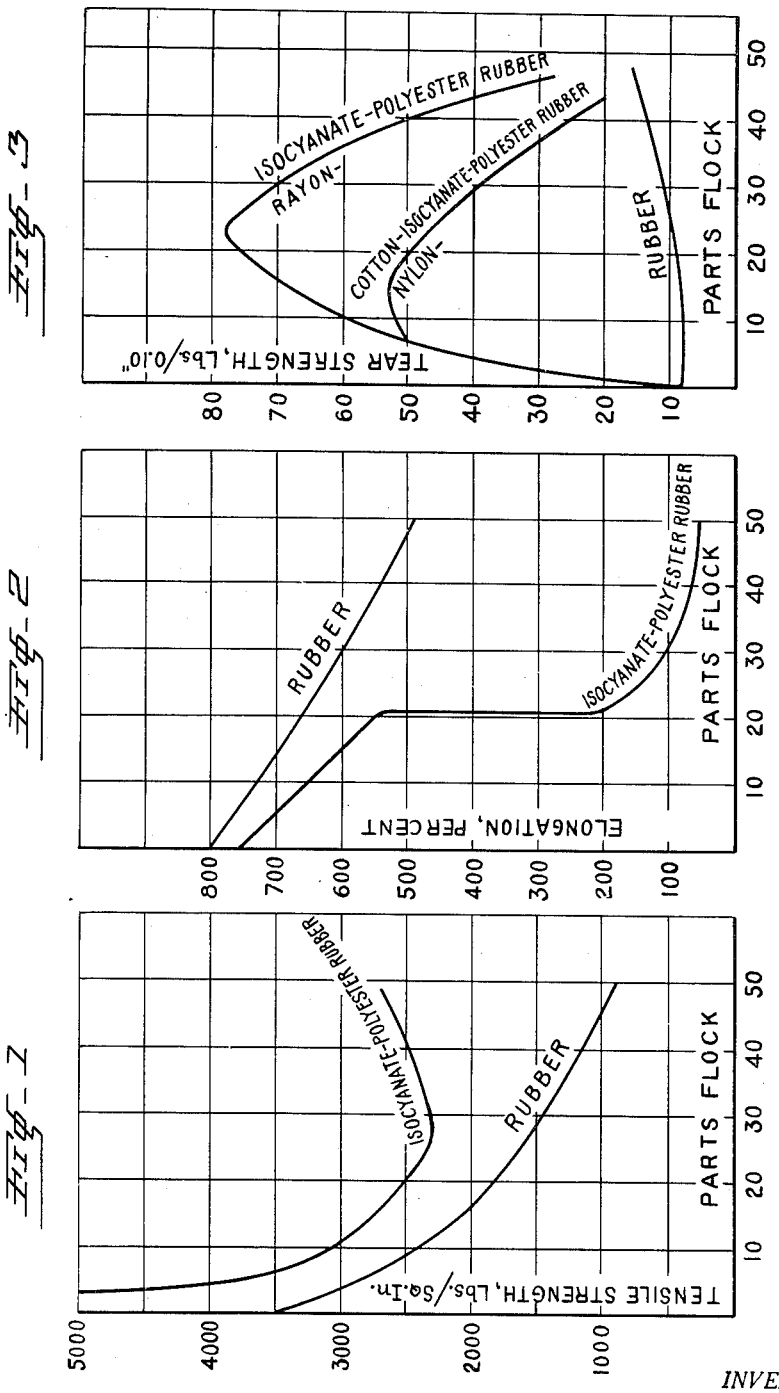

2,751,363
FLOCK-FILLED ISOCYANATE-CONTAINING ELASTOMER

Frank S. Martin, Cranston, R. I., assignor to United States Rubber Company, New York, N. Y., a corporation of New Jersey Application April 2, 1953, Serial No. 346,474

5 Claims. (Cl. 260—9)

This invention relates to an improved composition of matter and more particularly to a cured mixture of an elastomeric synthetic polyurethane polymer (by which is meant an elastomeric polymeric cross-linked chain-extended diisocyanate-modified polyester or polyester amide) and flock, this cured mixture having exceptionally high tear resistance.

Elastomeric synthetic polyurethane polymers have recently become important as new rubbery materials. Such elastomeric synthetic polymers are described in detail in an article by O. Bayer et al. which appeared in Rubber Chemistry and Technology, volume 23, pages 812–835 (1950). As is now well-known, the elastomeric or rubbery synthetic polyurethanes are elastic materials capable when cured of being extended to more than 200% and returning rapidly to approximately their original length and are made from three reactants, viz., (1) linear polyesters or polyester amides, or mixtures thereof, (2) organic poly-isocyanates, and (3) initiators of cross-linking. The linear polyesters or polyester amides employed contain free hydroxyl or other groups containing active hydrogen such as free amino or amido groups.

These elastomeric synthetic polymers are often based upon diisocyanate-modified polyesters. As an example, adipic acid may be reacted with ethylene glycol to produce a polyester with hydroxyl groups at each end of the polyester molecules. The individual polyester molecules may be joined by reacting the terminal alcoholic hydroxyl groups with a diisocyanate such as p,p'-diphenylmethane diisocyanate. If the proper amount of the diisocyanate is used, the completed reaction will leave terminal isocyanate groups on the polyester-diisocyanate reaction product. Subsequent reaction with water or the like in relatively small amounts brings about urea bridging and thus introduces groups which are capable of cross-linking by reacting with some of the unreacted terminal isocyanate groups and converts the reaction product to the raw or "gum" state in which it resembles smoked sheet rubber. The final cross-linking or vulcanizing reaction is brought about by heat in a manner which manipulatively closely resembles vulcanization of natural rubber although chemically the cure is effected by a totally different mechanism since the polyurethane polymer contains, built into its molecules as a result of the water reaction, everything required for its curing which occurs as a result of reaction of the urea groups with remaining isocyanate groups.

In greater particularity, many of the elastomeric synthetic polyurethane polymers are made by (1) preparing a linear chain-extended polyester from a glycol, for example, a mixture of ethylene and propylene glycols, and an aliphatic saturated dicarboxylic acid, for example, adipic acid, using an excess of the glycol over the acid so that the resulting linear polyester contains terminal alcoholic hydroxyl groups, usually using such an amount of glycol as to give the polyester a hydroxyl number of 20 to 120 and preferably 40 to 80 and an acid value less than 2, (2) reacting this linear polyester with a diisocyanate, for example, naphthylene-1,5-diisocyanate or p,p'-diphenyl- methane diisocyanate, using a considerable excess, commonly from 20 to 250% and preferably from 50 to 100%, of the diisocyanate over the theoretical amount corresponding to the alcoholic hydroxyl groups furnished by the polyester, by heating a mixture of the polyester and the diisocyanate under anhydrous conditions at an elevated temperature, e. g., 70–150° C., to form a liquid material which is a linear polyurethane having terminal isocyanate groups, and (3) reacting this liquid material (which is often termed a "polyester-diisocyanate") with a small amount of water, typically equal to about 0.6 to 0.95 mol per mol of the liquid material to convert the liquid material to solid ("gum") form resembling uncured ("gum") smoked sheet natural rubber. The water reacts with a portion only of the isocyanate groups present, converting them to —NH₂ groups which are highly reactive with other isocyanate groups to form urea groups which are reactive with remaining isocyanate groups to give a highly cross-linked product. The "gum" material is cured, i. e., is converted to a form resembling vulcanized natural rubber by simply heating it under pressure at an elevated temperature, say 100–170° C., for a suitable period of time, say from 10 minutes to two hours. Instead of water as the material used to convert the liquid intermediate to "gum" form and initiate the curing mechanism, other chemicals, e. g., trihydric and higher polyhydric alcohols, beta-aminoethyl alcohol, and polyamines such as diamines, can be used.

Other commercially important synthetic elastomeric polyurethane polymers are made in the same way except that the polyester is replaced with a polyester amide, such as one made by esterifying a glycol with an aliphatic saturated dicarboxylic acid in the presence of an amino alcohol, e. g., an alkanolamine, or a diamine, e. g., an alkylene diamine.

In some cases the synthetic elastomeric polyurethane polymer is made by reacting together in suitable fashion (1) a polyester or polyester amide, (2) a bifunctional compound like a diamine, and (3) a diisocyanate, such as naphthylene-1,5-diisocyanate or p,p'-diphenylmethane diisocyanate to give an uncured elastomeric product, and effecting curing of the resulting uncured reaction product by intimately admixing therewith an organic polyisocyanate, generally a diisocyanate identical with that previously employed, in amount sufficient to effect curring, often in amount such as to bring the total number of —NCO equivalents in the cured composition to around 3 equivalents of —NCO per mol of polyester or polyester amide, and subjecting the resulting mixture to heat and pressure.

The cured elastomeric synthetic polyurethane polymers have many of the physical characteristics of natural rubber and similar elastomeric materials. They have good abrasion-resistance and tear-resistance and these properties make them considerably better than natural rubber or the more common synthetic rubbers for many uses. However, the tear resistance of these synthetic polyurethane polymers is not sufficiently high for many purposes.

The principal object of the present invention is to greatly enhance the already high tear-resistance of such elastomeric synthetic polyurethane polymers and to render them highly suitable for use in applications requiring exceedingly high tear-resistance, for example, in the fabrication of articles made by sewing relatively thin sheets of the polymers to form clothing, bags, cases, covers, and the like.

I have discovered that the addition of flock to the elastomeric synthetic polyurethane polymer prior to curing thereof brings about a remarkable increase in its tear resistance. This was highly unexpected because flock does not materially increase the tear resistance of ordinary rubber. The curves in the accompanying drawing compare the behavior of flock as a filling agent in rubber (by which is meant natural rubber) with its behavior in synthetic elastomeric polyurethane polymers. It should be pointed out that the curves in the drawing accurately portray general trends observed in a number of experiments and do not reproduce exactly the results of any given series of experiments. The incorporation of flock with natural rubber in increasing amounts follows the characteristic pattern shown by the curves labelled "Rubber" in Figs. 1, 2 and 3. These curves show that as the amount of flock is increased the tensile strength and elongation decrease while the tear resistance increases only slightly. Essentially identical results are obtained with different types of flock, e. g., cotton, nylon and rayon flock. The composition of the natural rubber compound from which the curves labelled "Rubber" were obtained was as follows:

NATURAL RUBBER—FLOCK COMPOUND

| | Parts by weight |
|---|---|
| Smoked sheets natural rubber | 100 |
| Stearic acid | 1 |
| Zinc oxide | 5 |
| Mercaptobenzothiazole (accelerator) | 1 |
| Sulfur | 3 |
| Flock | As indicated |

The above compound was mixed on an open rubber mill and press cured in slab form in the manner conventionally used in studying rubber compounds. The cures were for 15 and 30 minutes with steam at a pressure of 40 pounds per square inch in the press platens (141° C.). Tensile, elongation and tear values were measured on the conventional Scott tester. Tear-resistance was measured with the grain of the sample using the rectilinear tear test and a sample 0.10 inch thick. The natural rubber curves, showing the effect of increasing the flock content of the rubber compound, followed the expected pattern.

Unexpected results were obtained when synthetic elastomeric polyurethane polymer compounds were made and cured in order to determine the effect of adding varying proportions of flock to such a polymer. Typical results are portrayed by the curves designated "Isocyanate-Polyester Rubber" in Figs. 1, 2 and 3, the physical properties being measured in the same way as for the regular rubber compounds and being shown as functions of the parts of flock added per 100 parts of synthetic elastomeric polyurethane polymer. Figs. 1 and 2 show the data for cotton flock. Examination of Fig. 1 shows that the tensile follows about the pattern in natural rubber, although it is higher and there is some indication that it may go through a minimum at some value between 20 and 40 parts of flock and then increase with the addition of more flock. Examination of Figs. 2 and 3 shows that the elongation and particularly the tear-resistance curves are very unusual. As the amount of flock is increased above about 20 parts the elongation suddenly drops to a low value and continues to decrease at a slower rate as more flock is added. At about the same point at which the elongation suddenly decreases, the tear-resistance goes through a very pronounced maximum.

The maximum tear-resistance obtained by adding increasing amounts of flock is three to five times that obtained with the uncompounded synthetic polyurethane polymer. The amount of flock required to produce the maximum tear-resistance and the maximum tear-resistance obtained vary with the type of flock used.

The cotton and nylon flocks gave roughly the same tear-resistance while the rayon flock gave substantially higher tear-resistance than either cotton or nylon flock. The size of fibers in the flock may be of some importance in determining the actual values of the maximum tear-resistance obtained with any specific type of flock. However, all of the flocks tested gave unexpectedly high tear-resistance at a value between 10 and 30 parts of flock per 100 parts of synthetic polyurethane polymer.

The isocyanate-polyester rubber compound used was as follows:

ISOCYANATE-POLYESTER RUBBER-FLOCK COMPOUND

| | Parts by weight |
|---|---|
| Isocyanate-polyester rubber [1] | 100 |
| Flock | As indicated |

[1] Made as follows: Adipic acid is esterified with an excess of a mixture of ethylene and propylene glycols in a molar ratio of 70 moles of ethylene glycol to 30 moles of propylene glycol, water being distilled off followed by a removal of some glycol by distillation to give a polyester containing terminal alcoholic hydroxyl groups. This polyester has a hydroxyl value of about 50, an acid value below 2 and a molecular weight of about 2,000. This polyester is then reacted with p,p'-diphenylmethane diisocyanate, using two moles of the latter per mole of the former to give a liquid polyesterdiisocyanate intermediate. This liquid intermediate is placed in a Werner-Pfliederer mixer and water in amount equal to about 1 mole per mole of intermediate is added with mixing to convert the liquid intermediate to the uncured "gum" stage.

The isocyanate-polyester rubber-flock compound was prepared for testing by mixing the uncured rubbery isocyanate-polyester-water reaction product with the flock on a rubber mill, sheeting out, and curing the sheeted mixture in a press in a manner similar to that conventionally used for the preparation of test slabs of ordinary rubber compounds. Mixing was carried out on a cold rubber mill and curing was for 30 minutes with steam at a pressure of 40 p. s. i. in the press platens.

While I prefer to use from 10 to 30 parts of the flock per 100 parts of polyurethane polymer, I can use a somewhat broader range, say from 2 to 40 parts per 100 parts of polymer.

Instead of mixing the flock with the uncured "gum" polyurethane, as described above, I can use other methods of preparing the flock-filled compositions contemplated by my invention. For example, I can intimately incorporate the flock with the polyester-diisocyanate intermediate prior to reaction thereof with water or other chemical to introduce the urea bridging groups and initiate the curing reaction. This intermediate is usually a liquid resembling molasses in consistency and, like molasses, becoming less viscous when warmed. However, it may be a solid, which is thermoplastic, being linear. The extremely high chemical reactivity of the intermediate makes it very practical to incorporate the flock directly therewith, since this provides an opportunity for chemical reaction between the intermediate and the flock. Such reaction is expedited if the intermediate is in liquid condition when the flock is incorporated therewith.

I believe that the unique results of my invention are due to chemical reaction between the flock and the polyesterdiisocyanate intermediate or the uncured "gum" material produced therefrom. Thus those flocks which are made from cellulose, e. g., cotton or rayon flock, contain hydroxyl groups, while nylon flock, being a synthetic linear polyamide, contains reactive groups. Glass flock contains water molecularly adsorbed on its surface and also contains other reactive groups on its surface.

As will be obvious, in practicing my invention I incorporate the flock with either the polyester-diisocyanate reaction product or the uncured "gum" rubbery material produced by reacting this reaction product with water or the like. Those skilled in the art can readily distinguish this uncured rubbery material from the cured material by the fact that the uncured material can be milled on a rubber mill in a manner similar to uncured natural rubber whereas the cured material has undergone a chemical cross-linking reaction which converts it to a state such that it cannot be milled in this manner.

The following examples illustrate my invention in more detail.

Natural rubber compounds and synthetic polyurethane elastomer compounds, filled with varying amounts of cotton flock, rayon flock and nylon flock were prepared according to the above formulations, sheeted out, cured in the manner described above and tested with the results shown in Tables I to VI below.

The cotton flock used in these stocks was that known as "F60" supplied by Harwick Standard Chemical Co., Boston, Mass. The rayon flock was that known as "F-7 Verlon Flock" and the nylon flock was that known as "N706 Nylon Flock," both supplied by Vertipile Company, Lowell, Mass.

Table I
COTTON FLOCK LOADING OF NATURAL RUBBER

| Parts of flock per 100 rubber | 0 | 2 | 5 | 10 | 20 | 30 | 50 |
|---|---|---|---|---|---|---|---|
| Tensile, p. s. i. | 3,500 | 3,000 | 2,500 | 2,200 | 1,800 | 1,400 | 800 |
| Elongation, percent | 800 | 775 | 750 | 725 | 650 | 550 | 450 |
| Tear | 7.5 | 8.0 | 7.3 | 8.0 | 11.5 | 13 | 11 |

Table II
RAYON FLOCK LOADING OF NATURAL RUBBER

| Parts of flock per 100 rubber | 0 | 2 | 5 | 10 | 20 | 30 | 50 |
|---|---|---|---|---|---|---|---|
| Tensile, p. s. i. | 3,500 | 3,000 | 2,100 | 2,000 | 1,700 | 1,300 | 850 |
| Elongation, percent | 800 | 775 | 725 | 700 | 650 | 575 | 500 |
| Tear | 7.5 | 6.5 | 6.3 | 7.0 | 9.7 | 11 | 17 |

Table III
NYLON FLOCK LOADING OF NATURAL RUBBER

| Parts of flock per 100 rubber | 0 | 2 | 5 | 10 | 20 |
|---|---|---|---|---|---|
| Tensile, p. s. i. | 3,500 | 3,000 | 2,700 | 2,400 | 1,600 |
| Elongation, percent | 800 | 750 | 750 | 700 | 650 |
| Tear | 7.5 | 6.3 | 6.3 | 7.3 | 8.0 |

Table IV
COTTON FLOCK LOADING OF ISOCYANATE-POLYESTER RUBBER

| Parts of flock per 100 rubber | 0 | 10 | 15 | 20 | 30 | 50 |
|---|---|---|---|---|---|---|
| Tensile, p. s. i. | | 2,650 | 2,150 | 1,700 | 2,300 | 2,800 |
| Elongation, percent | | 650 | 600 | 150 | 50 | 25 |
| Tear | 13 | 38 | 44 | 38 | 23 | 14 |

Table V
RAYON FLOCK LOADING OF ISOCYANATE-POLYESTER RUBBER

| Parts of flock per 100 rubber | 5 | 10 | 15 | 20 | 30 | 50 |
|---|---|---|---|---|---|---|
| Tensile, p. s. i. | 5,000 | 3,200 | 3,100 | 2,100 | 2,200 | 2,600 |
| Elongation, percent | 700 | 700 | 650 | 500 | 50 | 25 |
| Tear | 35 | 56 | 69 | 78 | 75 | 16 |

Table VI
NYLON FLOCK LOADING OF ISOCYANATE-POLYESTER RUBBER

| Parts of flock per 100 rubber | 5 | 10 | 15 | 20 | 30 | 50 |
|---|---|---|---|---|---|---|
| Tensile, p. s. i. | 4,000 | 3,100 | 2,800 | 2,000 | 2,300 | 2,600 |
| Elongation, percent | 725 | 600 | 600 | 100 | 90 | 50 |
| Tear | 41 | 58 | 47 | 47 | 23 | 13 |

The term "flock" is used herein in its ordinary sense to denote a fibrous material the ultimate particles of which are small in cross-section and are relatively long in comparison to diameter although they are commonly considered to be short, usually not exceeding 0.1 inch in length. The flock may be multifilamentary, i. e., each particle may comprise a bundle of fibers, as in the case of cotton flock, "alpha flock" (the highly, purified wood cellulose described in an article entitled "Wood Cellulose in Rubber Compounding" by Goodloe et al. in The Rubber Age, N. Y. 61, 697–703 (1947)) or it may be monofilamentary as in the case of rayon or nylon or glass flock which is made from artificially formed monofilamentary material. I can use flocks other than those mentioned above, e. g., wool flock.

As an example of the use of glass flock in my invention, I compounded 100 parts of the uncured isocyanate-polyester rubber used in the above examples with 15 parts of the glass flock known as "Fibra Glass" (chopped glass fiber having a cationic sizing, furnished by Owens-Corning Fiber Glass Co. of Newark, Ohio) and cured in the same way as before. The cured samples had the following physical properties:

| Gauge of Sample | Tensile, p. s. i. | Elongation, percent | Tear, lbs. |
|---|---|---|---|
| 0.099" | 5,060 | 700 | 51 |

The invention can be used for making any form of article. It is particularly useful for making improved articles requiring an air- and water-impervious rubbery sheet such as a thin unsupported sheet of rubbery material or a sheet of fabric which has been proofed on one or both sides with a thin layer of the rubbery material of the invention. Sheeting embodying flock-reinforced rubbery material made in accordance with the invention can advantageously be used in place of films or coated fabrics used in making waterproof clothing, diaphragms, upholstery material, luggage covering, equipment covers, instrument bags, carrying cases and the like. Thin sheets, with or without fabric reinforcement, can readily be sewn in the manufacture of articles of the types just mentioned. The seams of such articles show no tendency to fail because of tearing of the elastomeric sheet at the stitches as is the case with such articles made from unsupported sheets of ordinary rubber or of plastic.

The flock-reinforced elastomeric material of my invention can be used advantageously in applications requiring high tear-resistance in a rubbery material, in either sheet or solid form. The flock-reinforced material of my invention can be used to replace leather in many articles such as belts, shoes, bags, cases, covers, bellows, ball covers, etc.

Having thus described my invention, what I claim and desire to protect by Letters Patent is:

1. A synthetic elastomeric composition characterized by improved tear resistance comprising from 2 to 40 parts of a fibrous flock selected from the group consisting of cellulose flock, nylon flock, glass flock and wool flock as a reinforcing filler for the said elastomeric composition, and 100 parts of a polyurethane polymer which is a reaction product of a polyester and a diisocyanate cured to an elastomeric state in the presence of available isocyanate groups attached to the said polyurethane, and said polymer having been cured in admixture with the said flock.

2. A synthetic elastomeric composition characterized by improved tear resistance comprising (A) 100 parts of polyurethane polymer which is a reaction product of a polyester and a diisocyanate and which contains terminal isocyanate groups, cured to an elastomeric state in admixture with (B) from 10 to 30 parts of cellulose flock, as a reinforcing filler for the said elastomeric composition.

3. A synthetic elastomeric composition as in claim 2 in which the said cellulose flock is cotton flock.

4. A synthetic elastomeric composition characterized by improved tear resistance comprising (A) 100 parts of a polyurethane polymer which is a reaction product of a polyester and a diisocyanate and which contains terminal isocyanate groups, cured to an elastomeric state in admixture with (B) from 10 to 30 parts of nylon flock, as a reinforcing filler for the said elastomeric composition.

5. A synthetic elastomeric composition characterized by improved tear resistance comprising (A) 100 parts of a polyurethane polymer which is a reaction product of a polyester and a diisocyanate and which contains terminal isocyanate groups, cured to an elastomeric state in admixture with (B) from 10 to 30 parts of glass flock, as a reinforcing filler for the said elastomeric composition.

References Cited in the file of this patent

UNITED STATES PATENTS 2,490,001   Jayne et al. _____ Nov. 29, 1949

OTHER REFERENCES

Bayer et al.: Article in Rubber Chem. & Tech., Oct.–Dec., 1950, pages 814–820, 823, 824, 826 and 827.